(12) United States Patent
Safonov

(10) Patent No.: US 12,447,197 B2
(45) Date of Patent: Oct. 21, 2025

(54) MULTIPARTICULATE GRANULATE COMPRISING INSULIN

(71) Applicant: Elgan Pharma Ltd, Nazareth (IL)

(72) Inventor: Roman Safonov, Ramat-Gan (IL)

(73) Assignee: Elgan Pharma Ltd, Nazareth (IL)

( * ) Notice: Subject to any disclaimer, the term of this patent is extended or adjusted under 35 U.S.C. 154(b) by 376 days.

(21) Appl. No.: 17/993,916

(22) Filed: Nov. 24, 2022

(65) Prior Publication Data

US 2023/0181695 A1    Jun. 15, 2023

Related U.S. Application Data

(63) Continuation of application No. 16/943,822, filed on Jul. 30, 2020, now abandoned, which is a continuation of application No. 16/711,689, filed on Dec. 12, 2019, now abandoned, which is a continuation of application No. PCT/US2018/037092, filed on Jun. 12, 2018.

(60) Provisional application No. 62/518,271, filed on Jun. 12, 2017.

(51) Int. Cl.
| | |
|---|---|
| *A61K 38/28* | (2006.01) |
| *A23L 33/00* | (2016.01) |
| *A23L 33/18* | (2016.01) |
| *A61K 9/14* | (2006.01) |
| *A61K 9/16* | (2006.01) |

(52) U.S. Cl.
CPC ............. *A61K 38/28* (2013.01); *A23L 33/18* (2016.08); *A23L 33/30* (2016.08); *A23L 33/40* (2016.08); *A61K 9/141* (2013.01); *A61K 9/1652* (2013.01)

(58) Field of Classification Search
None
See application file for complete search history.

(56) References Cited

U.S. PATENT DOCUMENTS

| | | |
|---|---|---|
| 6,365,177 B1 | 4/2002 | Shahadeh et al. |
| 6,685,967 B1 | 2/2004 | Patton et al. |
| 6,740,332 B2 | 5/2004 | Zyck et al. |
| 2002/0064549 A1 | 5/2002 | Shehadeh |
| 2005/0136121 A1 | 6/2005 | Kershman et al. |
| 2020/0113977 A1 | 4/2020 | Safonov |
| 2021/0008171 A1 | 1/2021 | Safonov |

FOREIGN PATENT DOCUMENTS

| | | | |
|---|---|---|---|
| CN | 101301476 A | * 11/2008 | |
| WO | WO 02/45690 | 6/2002 | |
| WO | WO 2005/035088 | 4/2005 | |
| WO | WO-2007096906 A2 | * 8/2007 | ......... A61K 47/6951 |
| WO | WO 2008/014175 | 1/2008 | |
| WO | WO 2013/157003 | 10/2013 | |
| WO | WO 2013/179290 | 12/2013 | |
| WO | WO 2018/231820 | 12/2018 | |

OTHER PUBLICATIONS

Daimon et al., J. Mater. Chem. B 2:1802-1812 (2014) (Year: 2014).*
Ungaro et al., Eur. J. Pharm. Sci. 28:423-432 (2006) (Year: 2006).*
Sajeesh et al., J. Contr. Rel. 147:377-384 (2010) (Year: 2010).*
Comparison of NTRA-2112 produced in 2014 versus 2017-2018, 9 pages (received on Mar. 26, 2025) (Year: 2025).*
Communication Pursuant to Article 94(3) EPC Dated Jan. 3, 2022 From the European Patent Office Re. Application No. 18816847.0. (9 Pages).
Communication Pursuant to Article 94(3) EPC Dated Jun. 17, 2022 From the European Patent Office Re. Application No. 18816847.0. (12 Pages).
International Preliminary Report on Patentability Dated Dec. 17, 2019 From the International Bureau of WIPO Re. Application No. PCT/US2018/037092. (5 Pages).
International Search Report and the Written Opinion Dated Aug. 30, 2018 From the International Searching Authority Re. Application No. PCT//US2018/037092. (8 Pages).
Official Action Dated May 24, 2022 from US Patent and Trademark Office Re. U.S. Appl. No. 16/943,822. (35 pages).
Supplementary European Search Report and the European Search Opinion Dated Feb. 11, 2021 From the European Patent Office Re. Application No. 18816847.0. (11 Pages).
ClinicalTrials "A Study to Assess the Efficacy and Safety of NTRA-2112 in Preterm Infants", ClinicalTrials.gov, XP055742556, History of Changes for Study: NCT02510560, 3 P., Jul. 26, 2015.
Merriam-Webster "Disperse", Merriam-Webster, 1-15 P., May 18, 2022.
Nutrinia "Nutrinia Announces First Patient Enrolled in Phase III Trial: Proprietary Oral Formulation of Insulin Intestinal Malabsorption in Infants", Nutrinia Ltd., News Release, 4 P., Nov. 3, 2016.
Communication Pursuant to Article 94(3) EPC Dated Feb. 23, 2023 From the European Patent Office Re. Application No. 18816847.0 (13 Pages).

* cited by examiner

Primary Examiner — Thea D' Ambrosio

(57) ABSTRACT

The present invention is directed to multiparticulate granulate compositions comprising particles of insulin and particles of an infant nutritional excipient, wherein the multiparticulate granulate is substantially free of layers of insulin and excipient, methods of making thereof, and methods of use thereof.

8 Claims, 4 Drawing Sheets

MULTIPARTICULATE GRANULATE COMPRISING INSULIN

This application is a continuation of U.S. patent application Ser. No. 16/943,822 filed on Jul. 30, 2020, which is a continuation application of U.S. application Ser. No. 16/711,689 filed on Dec. 12, 2019, which is a continuation of PCT International Application No. PCT/US2018/037092 filed on Jun. 12, 2018, which claims priority of U.S. Provisional Application No. 62/518,271 filed on Jun. 12, 2017, the contents of which are incorporated herein by reference in its entirety.

FIELD AND BACKGROUND OF THE INVENTION

Preterm infants have an under-developed gastrointestinal (GI) tract that puts them at high risk for intestinal malabsorption and often leads to prolonged dependency on parenteral nutrition support. However, enteral nutrition during early life plays an important role in GI tract growth and development and, as such, preterm infants should be transitioned to enteral nutrition (preferably exclusive enteral feeding) as soon as possible.

Similarly, preterm and full-term infants suffering from short bowel syndrome (SBS), a malabsorption condition where patients are unable to absorb enough nutrients and fluids from the food they eat due to the surgical resection of a large part of their intestines, require prolonged parenteral nutrition support. Evidence suggests that the infant survival rates after massive small bowel resection depend on the ability of the residual bowel to adapt while decreasing the probability of parenteral nutrition associated co-morbidities. Moreover, successful intestinal adaptation allows patients with SBS to grow and remain healthy while receiving oral nutrition or enteral nutrition. Thus, the most important therapy for infants with SBS is the early introduction of enteral nutrition, which assists in GI tract growth and development.

Insulin plays a role in intestinal growth, cell maturation, and differentiation and has been shown to enhance intestinal adaptation. Emerging evidence suggests that orally- and nasogastrically-administered insulin accelerates the natural course of intestinal adaption and maturation in preterm and SBS infants and, as such, hastens the transition from parenteral nutrition to enteral nutrition in such infants.

Accordingly, there is a need for insulin-containing compositions that are suitable for use in preterm and SBS infants. The present invention addresses this and other needs.

SUMMARY OF THE INVENTION

In one aspect, the present disclosure provides a multiparticulate granulate comprising particles of insulin and particles of an infant nutritional excipient, wherein the multiparticulate granulate is substantially free of layers of insulin and excipient.

In one aspect, the present disclosure provides a method for preparing a multiparticulate granulate comprising particles of insulin and particles of an infant nutritional excipient, the multiparticulate granulate is substantially free of layers of insulin and excipient.

In another aspect, the present disclosure provides a package filled with a multiparticulate granulate comprising particles of insulin and particles of an infant nutritional excipient, the multiparticulate granulate is substantially free of layers of insulin and excipient.

In yet another aspect, the present disclosure provides a method of treating an infant disease or disorder, comprising administering a therapeutically-effective amount of multiparticulate granulate comprising particles of insulin and particles of an infant nutritional excipient, the multiparticulate granulate is substantially free of layers of insulin and excipient.

DESCRIPTION OF SPECIFIC EMBODIMENTS OF THE INVENTION

Figure 1:
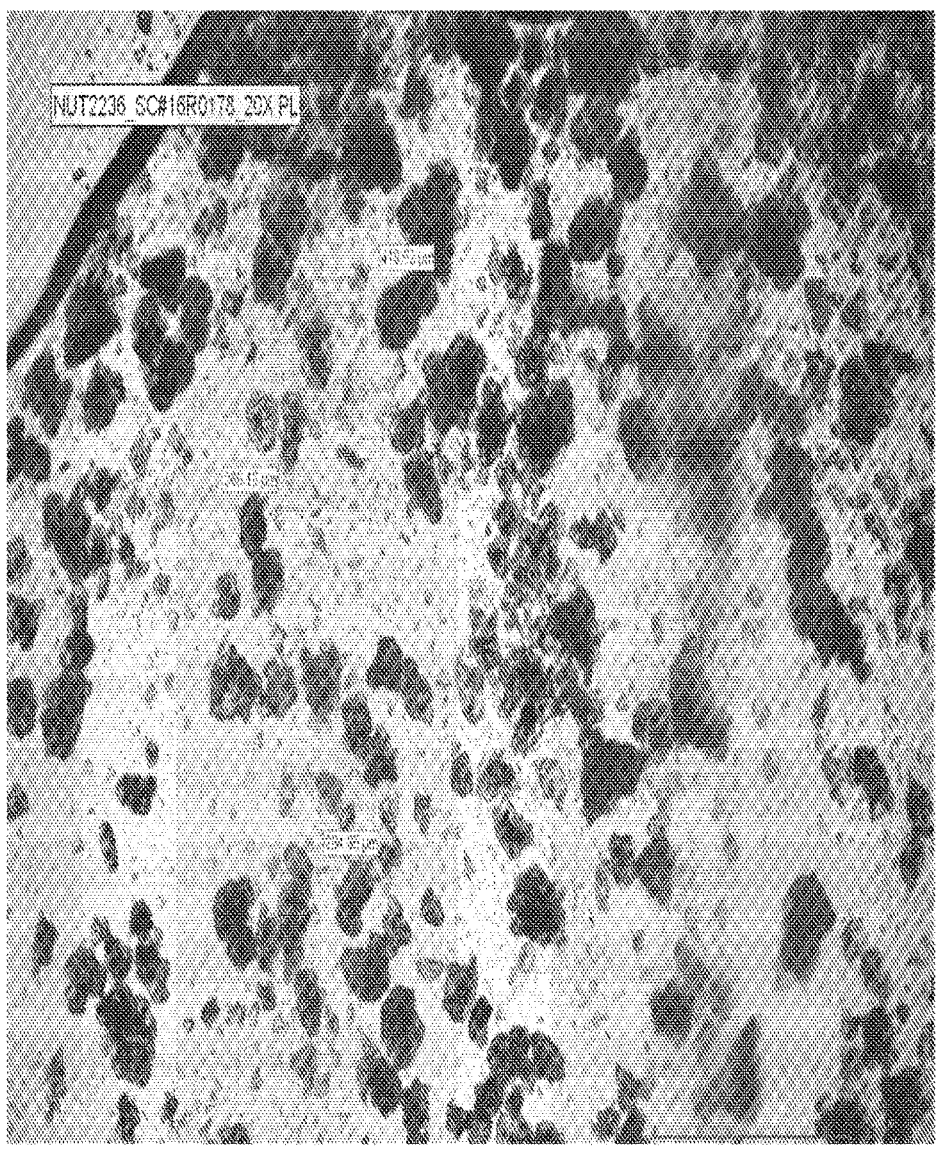
FIG. 1 shows a microscopy image of a multiparticulate cogranulate of the present disclosure.

Orally- and nasogastrically-administered insulin are promising therapies for the treatment of preterm and SBS infants. However, there are problems inherent in developing insulin-based therapies, especially a nasogastric therapy, for these patients.

First, preterm and SBS infants are generally unable to swallow solid dosage forms so, prior to oral or nasogastric administration, a solid insulin-containing composition must be dissolved in a suitable solvent. However, insulin is poorly soluble in most aqueous solvents, which are preferred for infant patients, so reconstituting the solid drug product for administration is problematic. Next, the amount of insulin required to treat infant patients is low and, as such, the drug product (and its manufacturing process) must consistently provide an accurate, low-dose insulin content. Furthermore, it is generally difficult to provide accurate nasogastric doses of insulin because insulin non-specifically binds to plastics (including those used in most nasogastric tubes), which results in a difference of insulin concentration before and after the nasogastric solution passes through the nasogastric tube. Finally, insulin degrades during standard pharmaceutical processing methods and during drug product storage, thereby complicating the design of insulin-containing drug products and their methods of manufacture.

Accordingly, there is a need in the art for low-dose insulin compositions that provide consistent content uniformity, readily dissolve in aqueous solvents and are stable during drug product manufacture and long-term storage. The present inventors have discovered an insulin-containing multiparticulate granulate that meets these needs.

Definitions

The term "about" when immediately preceding a numerical value means a range of plus or minus 10% of that value, e.g., "about 50" means 45 to 55, "about 25,000" means 22,500 to 27,500, etc., unless the context of the disclosure indicates otherwise, or is inconsistent with such an interpretation. For example in a list of numerical values such as "about 49, about 50, about 55, . . . ", "about 50" means a range extending to less than half the interval(s) between the preceding and subsequent values, e.g., more than 49.5 to less than 52.5. Furthermore, the phrases "less than about" a value or "greater than about" a value should be understood in view of the definition of the term "about" provided herein.

The terms "effective amount" and "therapeutically effective amount" are used interchangeably in this disclosure and refer to an amount of a compound, or a salt, solvate or ester thereof, that, when administered to a patient, is capable of performing the intended result. The actual amount that comprises the "effective amount" or "therapeutically effective amount" will vary depending on a number of conditions including, but not limited to, the severity of the condition, the size of the patient, and the route of administration. A skilled medical practitioner can readily determine the appropriate amount using methods known in the medical arts.

The term "infant nutritional excipient" means any pharmaceutically acceptable excipient that is suitable for administration to infant patients, especially premature infants and infants with short bowel syndrome.

The term "pharmaceutical" or "pharmaceutically acceptable" when used herein as an adjective, means substantially non-toxic and substantially non-deleterious to the recipient. As used herein, the phrase "pharmaceutically acceptable" refers to those compounds, materials, compositions, carriers, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

The term "prodrug" or "pharmaceutically acceptable prodrug," as used herein refers to a compound that is transformed in vivo to yield the parent compound, for example by hydrolysis. As used herein, the term "prodrug" is encompassed by the term "derivative." Effective dosages of the insulin and the other active ingredients in this disclosure can be the same as those previously reported for the particular compound, and modified according to ordinary skill in the art.

The term "salts" as used herein embraces pharmaceutically acceptable salts commonly used to form alkali metal salts of free acids and to form addition salts of free bases. The nature of the salt is not critical, provided that it is pharmaceutically acceptable. The term "salts" also includes solvates of addition salts, such as hydrates, as well as polymorphs of addition salts. Suitable pharmaceutically acceptable acid addition salts can be prepared from an inorganic acid or from an organic acid. Examples of such inorganic acids are hydrochloric, hydrobromic, hydroiodic, nitric, carbonic, sulfuric, and phosphoric acid. Appropriate organic acids can be selected from aliphatic, cycloaliphatic, aromatic, arylaliphatic, and heterocyclyl containing carboxylic acids and sulfonic acids, for example formic, acetic, propionic, succinic, glycolic, gluconic, lactic, malic, tartaric, citric, ascorbic, glucuronic, maleic, fumaric, pyruvic, aspartic, glutamic, benzoic, anthranilic, mesylic, stearic, salicylic, p-hydroxybenzoic, phenylacetic, mandelic, embonic (pamoic), methanesulfonic, ethanesulfonic, benzenesulfonic, pantothenic, toluenesulfonic, 2-hydroxyethanesulfonic, sulfanilic, cyclohexylaminosulfonic, algenic, 3-hydroxybutyric, galactaric and galacturonic acid.

Multiparticulate Granulate

The present disclosure provides a multiparticulate granulate comprising particles of insulin and particles of an infant nutritional excipient, wherein the multiparticulate granulate is substantially free of layers of insulin, and excipient, for example a pharmaceutically acceptable excipient, layered over the insulin particles. In some embodiments, the insulin is recombinant human insulin. In the context of the multiparticulate granulate of the present disclosure, the insulin and infant nutritional excipient form a substantially agglomerated structure rather than a layered structure.

In some embodiments, the insulin particles are dispersed on particles of the infant nutritional excipient. For example, particles of insulin can be deposited or dispersed onto relatively larger particles of an infant nutritional excipient, such as those described herein. In other embodiments, the insulin particles can be granulated with particles of the infant nutritional excipient. In still other embodiments, some insulin particles are dispersed on the particles of the infant nutritional particles while others are not (i.e., the insulin particles are partially dispersed on the infant nutritional particles). The skilled artisan will recognize that when the particles of insulin are dispersed on particles of the infant nutritional excipient, some portion of the insulin may exist in the composition as separate particles, which do not adhere to the particles of the infant nutritional excipient.

In some embodiments, the infant nutritional excipient is a modified or unmodified polysaccharide or sugar alcohol. In certain embodiments, the infant nutritional excipient is selected from the group consisting of maltodextrin, sorbitol, maltose, fructose, sucrose, lactose monohydrate, anhydrous lactose, starch, pregelatinized starch, cellulose, carboxymethylcellulose, mannitol, xylitol and mixtures thereof.

In some embodiments, the infant nutritional excipient is maltodextrin. In further embodiments, the maltodextrin has a dextrose equivalent (DE) value of between about 2 to about 20, including about 19, about 18, about 17, about 16, about 15, about 14, about 13, about 12, about 11, about 10, about 9, about 8, about 7, about 6, about 5, about 4, and about 3 including all ranges there between. In additional further embodiments, the maltodextrin has a DE value of less than about 20, less than about 19, less than about 18, less than about 17, less than about 16, less than about 15, less than about 14, less than about 13, less than about 12, less than about 11, less than about 10, less than about 9, less than about 8, less than about 7, less than about 6, less than about 5, less than about 4, less than about 3, or less than about 2.

In certain embodiments, the infant nutritional excipient is maltodextrin having dextrose equivalent (DE) value of about 20, about 19, about 18, about 17, about 16, about 15, about 14, about 13, about 12, about 11, about 10, about 9, about 8, about 7, about 6, about 5, about 4, about 3, or about 2.

In some embodiments, the weight ratio of infant nutritional excipient to insulin in the multiparticulate granulate ranges from about 2,500 to 1 to about 750,000 to 1. In particular embodiments, the weight ratio of infant nutritional excipient to insulin in the multiparticulate granulate is about 700,000 to 1; about 650,000 to 1; about 600,000 to 1; about 550,000 to 1; about 500,000 to 1; about 450,000 to 1; about 400,000 to 1; about 350,000 to 1; about 300,000 to 1; about 250,000 to 1; about 200,000 to 1 about 150,000 to 1; about 140,000 to 1; about 100,000 to 1; about 50,000 to 1; and about 6,000 to 1, including all ranges there between. In particular embodiments, the weight ratio of infant nutritional excipient to insulin in the multiparticulate granulate is between about 500,000 to 1 to about 700,000 to 1. In particular embodiments, the weight ratio of infant nutritional excipient to insulin in the multiparticulate granulate is between about 50,000 to 1 to about 200,000 to 1.

Alternatively, the relative amounts of insulin and infant nutritional excipient may be expressed as a weight percent (wt. %). For example, the amount of insulin can range from about 0.0001 wt. % to about 0.04 wt. %, including about 0.0001, about 0.00012, about 0.00014, about 0.00016, about 0.00018, about 0.0002, about 0.00022, about 0.00024, about 0.00026, about 0.00028, about 0.0003, about 0.00032, about 0.00034, about 0.00036, about 0.00038, about 0.0004, about 0.00042, about 0.00044, about 0.00046, about 0.00048, about 0.0005, about 0.00052, about 0.00054, about 0.00056, about 0.00058, about 0.0006, about 0.00062, about 0.00064, about 0.00066, about 0.00068, about 0.0007, about 0.00072, about 0.00074, about 0.00076, about 0.00078, about 0.0008, about 0.00082, about 0.00084, about 0.00086, about 0.00088, about 0.0009, about 0.00092, about 0.00094, about 0.00096, about 0.00098, about 0.001, about 0.0012, about 0.0014, about 0.0016, about 0.0018, about 0.002, about 0.0022 v about 0.0024, about 0.0026, about 0.0028, about 0.003, about 0.0032, about 0.0034, about 0.0036, about 0.0038, about 0.004, about 0.0042, about 0.0044, about 0.0046, about 0.0048, about 0.005, about 0.0052, about 0.0054, about 0.0056, about 0.0058, about 0.006, about 0.0062, about 0.0064, about 0.0066, about 0.0068, about 0.007, about 0.0072, about 0.0074, about 0.0076, about 0.0078, about 0.008, about 0.0082, about 0.0084, about 0.0086, about 0.0088, about 0.009, about 0.01, about 0.012, about 0.014, about 0.016, about 0.018, about 0.02, about 0.022, about 0.024, about 0.026, about 0.028, about 0.03, about 0.032, about 0.034, about 0.036, about 0.038, or about 0.04 wt. %, inclusive of all ranges there between.

The amount of infant nutritional excipient is generally at least about 95%, or in some embodiments, at least about 96 wt. %, at least 97 wt. %, at least 98 wt. %, at least 99 wt. %, inclusive of all ranges there between. In still other embodiments, the amount of infant nutritional excipient is at least about 99.5 wt. %, at least about 99.6 wt. %, at least about 99.7 wt. %, or at least 99.8 wt. %, inclusive of all ranges there between.

In some embodiments, the multiparticulate granulate comprises one or more antioxidants. In some embodiments, the antioxidant is vitamin C.

In some embodiments, the multiparticulate granulate has a particle size ranging from about 125 μm to about 1000 μm, including about 150 μm, about 175 μm, about 200 μm, about 225 μm, about 250 μm, about 275 μm, about 300 μm, about 325 μm, about 350 μm, about 375 μm, about 400 μm, about 425 μm, about 450 μm, about 475 μm, about 500 μm, about 525 μm, about 550 mm, about 575 μm, about 600 μm, about 625 μm, about 650 μm, about 675 μm, about 700 μm, about 725 μm, about 750 μm, about 775 μm, about 800 μm, about 825 μm, about 850 μm, about 875 μm, about 900 μm, about 925 μm, about 950 μm, and about 975 μm, including all ranges there between.

In some embodiments, the multiparticulate granulate has an average particle size ranging from about 200 μm to about 650 μm, including about 225 μm, about 250 μm, about 275 μm, about 300 μm, about 325 μm, about 350 μm, about 375 μm, about 400 μm, about 425 μm, 450 μm, about 475 μm, about 500 μm, about 525 μm, about 550 μm, about 575 μm, about 600 μm, and about 625 μm, including all ranges there between. In particular embodiments, the multiparticulate granulate has an average particle size ranging from about 300 μm to about 600 μm.

In some embodiments, the multiparticulate granulate has a particle size characterized by having a $D_{10}$ in the range of about 5 μm to about 250 μm, including about 25 μm, about 50 μm, about 75 μm, about 100 μm, about 125 μm, about 150 μm, about 175 μm, about 200 μm, and about 225 μm, including all ranges there between.

In other embodiments, the multiparticulate granulate has a particle size characterized by having a $D_{50}$ in the range of about 150 μm to about 450 μm, including about 175 μm, about 200 μm, about 225 μm, about 250 μm, about 275 μm, about 300 μm, about 325 μm, about 350 μm, about 375 μm, about 400 μm, and about 425 μm, including all ranges there between.

In still other embodiments, the multiparticulate granulate has a particle size characterized by having a $D_{90}$ in the range of about 500 μm to about 1000 μm, including about 525 μm, about 550 μm, about 575 μm, about 600 μm, about 625 μm, about 650 μm, about 675 μm, about 700 μm, about 725 μm, about 750 μm, about 775 μm, about 800 μm, about 825 μm, about 850 μm, about 875 μm, about 900 μm, about 925 μm, about 950 μm, and about 975 μm, including all ranges there between.

In particular embodiments, the multiparticulate granulate has a particle size characterized by having a $D_{10}$ in the range of about 175 μm to about 225 μm; a $D_{50}$ in the range of about 375 μm to about 450 μm and a $D_{90}$ in the range of about 675 μm to about 750 μm.

In some embodiments, the particle size distribution of the multiparticulate granulate is monomodal.

Some embodiments provide a multiparticulate granulate, wherein the amount of insulin per gram of multiparticulate granulate is about 0.04 IU/g, about 0.2 IU/g, about 4 IU/g or about 8 IU/g.

Some embodiments provide a multiparticulate granulate, wherein the content uniformity of insulin as tested using the methods set forth in USP <905> Uniformity of Dosage Units monograph is within pharmaceutically-acceptable range. Certain embodiments provide a multiparticulate granulate, wherein the content uniformity of insulin as tested using the methods set forth in USP <905> Uniformity of Dosage Units monograph provides an acceptance value of not more than 15, not more than 14, not more than 13, not more than 12, not more than 11, not more than 10, not more than 9, not more than 8, not more than 7, not more than 6 or not more than 5, including all ranges there between. In certain embodiments, the multiparticulate granulate provides an acceptance value of not more than 15.

In other embodiments, the bulk uniformity of the compositions of multiparticulate granulate ranges from about 90-120%, with an RSD of not more than 5.0%.

In some embodiments, the multiparticulate granulates of the present disclosure rapidly dissolve in an aqueous medium. In certain embodiments, at least 60% of the multiparticulate granulates, at least 65% of the multiparticulate granulates, at least 70% of the multiparticulate granulates, at least 75% of the multiparticulate granulates, at least 80% of the multiparticulate granulates, at least 85% of the multiparticulate granulates, at least 90% of the multiparticulate granulates or at least 95% of the multiparticulate granulates dissolve within 5 minutes when the granulates are suspended in 0.9% saline (granulate to saline weight ratio of about 2 to 3) at about 25° C. and the suspension is vortex mixed at 600 rpm.

In some embodiments, the multiparticulate granulates of the present disclosure rapidly dissolve in breast milk. In certain embodiments, at least 60% of the multiparticulate granulates, at least 65% of the multiparticulate granulates, at least 70% of the multiparticulate granulates, at least 75% of the multiparticulate granulates, at least 80% of the multiparticulate granulates, at least 85% of the multiparticulate granulates, at least 90% of the multiparticulate granulates or at least 95% of the multiparticulate granulates dissolve within 5 minutes when the granulates are suspended in breast milk (granulate to breast milk weight ratio of about 2 to 3) at about 25° C. and the suspension is vortex mixed at 600 rpm.

In some embodiments, the multiparticulate granulate has moisture content of not more than about 7%, not more than about 6.5%, not more than about 6%, not more than about 5.5%, not more than about 5% or not more than about 4.5% by weight.

In some embodiments, the insulin of the multiparticulate granulate contains no more than about 5.5%, no more than about 5%, no more than about 4.5%, no more than about 4%, no more than about 3.5%, no more than about 3%, no more than about 2.5%, no more than about 2.0%, no more than about 1.5%, no more than about 1% or no more than about 0.5% by weight of A21 desamido human insulin.

In some embodiments, the insulin of the multiparticulate granulate contains no more than about 16%, no more than about 15%, no more than about 14%, no more than about 13%, no more than about 12%, no more than about 11%, no more than about 10%, no more than about 9%, no more than about 8%, no more than about 7%, no more than about 6% or no more than about 5% by weight of total related proteins.

In some embodiments, the insulin activity of the multiparticulate granulate decreases by no more than about 10%, no more than about 9%, no more than about 8%, no more than about 7%, no more than about 6%, no more than about 5%, no more than about 4%, no more than about 3%, or no more than about 2% when the granulate is stored at 25° C. (±2° C.) and 60% relative humidity (±5%) for 12 months. In certain embodiments, the insulin activity of the multiparticulate granulate decreases by no more than about 10%, no more than about 9%, no more than about 8%, no more than about 7%, no more than about 6%, no more than about 5%, no more than about 4%, no more than about 3%, or no more than about 2% when the granulate is stored at 25° C. (±2° C.) and 60% relative humidity (±5% RH) for 24 months.

Methods of Making Multiparticulate Granulate

The present disclosure provides a method for preparing a multiparticulate granulate comprising particles of insulin and particles of an infant nutritional excipient, the multiparticulate granulate is substantially free of layers of insulin and excipient.

In some embodiments, the method comprises (a) dissolving insulin in acidified water, (b) adjusting the pH of the resulting insulin solution with a base, (c) combining the resulting pH adjusted solution with saline to form an insulin solution, (d) dissolving an infant nutritional excipient in the insulin solution of (c), (e) granulating particles of an infant nutritional excipient in the presence of the solution of step (d); and (f) drying the granulated particles.

In some embodiments, the method consists of (a) dissolving insulin in acidified water, (b) adjusting the pH of the resulting insulin solution with a base, (c) combining the resulting pH adjusted solution with saline to form an insulin solution, (d) dissolving an infant nutritional excipient in the insulin solution of (c), (e) granulating particles of an infant nutritional excipient in the presence of the solution of step (d); and (f) drying the granulated particles.

In some embodiments, the method consists essentially of (a) dissolving insulin in acidified water, (b) adjusting the pH of the resulting insulin solution with a base, (c) combining the resulting pH adjusted solution with saline to form an insulin solution, (d) dissolving an infant nutritional excipient in the insulin solution of (c), (e) granulating particles of an infant nutritional excipient in the presence of the solution of step (d); and (f) drying the granulated particles.

In some embodiments, the concentration of the insulin in the solution of step (a) is about 50 IU/g, 75 IU/g, 100 IU/g or 125 IU/g.

In some embodiments, the pH of the acidified water in step (a) is about 1.5, about 2.0, about 2.5 or about 3.0. In certain embodiments, the pH of the acidified water is about 2.4. In certain further embodiments, the acidified water is aqueous hydrochloric acid.

In some embodiments, the pH of the solution following step (b) is about 7.5, about 7.75, about 8.0, about 8.25, about 8.5 or about 8.75. In certain embodiments, the pH of the solution following step (b) is about 8.25. In certain further embodiments, the base of step (b) is aqueous sodium hydroxide.

In particular embodiments, the infant nutritional excipient particles of step (e) range in size from about 125 µm to about 500 µm, including about 150 µm, about 175 µm, about 200 µm, about 225 µm, about 250 µm, about 275 µm, about 300 µm, about 325 µm, about 350 µm, about 375 mm, about 400 µm, about 425 µm, 450 µm, and about 475 µm, including all ranges there between.

In some embodiments, the granulation step (e) is carried out at a temperature of no more than about 25° C.; no more than about 30° C.; no more than about 35° C., no more than about 37° C., no more than about 40° C., no more than about 45° C., no more than about 50° C. or no more than about 55° C. In certain embodiments, the granulation step (e) is carried out for no more than about 10 hours, no more than about 9 hours, no more than about 8 hours, no more than about 7 hours, no more than about 6 hours, no more than about 5 hours, no more than about 4 hours, no more than about 3 hours, or no more than about 2 hours.

In some embodiments, the drying step (f) is carried out at a temperature of no more than about 25° C.; no more than about 30° C.; no more than about 35° C., no more than about 37° C., no more than about 40° C., no more than about 45° C., no more than about 50° C. or no more than about 55° C. In certain embodiments, the step (f) is carried out for no more than about 10 hours, no more than about 9 hours, no more than about 8 hours, no more than about 7 hours, no more than about 6 hours, no more than about 5 hours, no more than about 4 hours, no more than about 3 hours, or no more than about 2 hours.

In certain embodiments, after the drying step (f), the moisture content of the multiparticulate granulate is no more than about 7%, no more than about 6.5%, no more than about 6%, no more than about 5.5%, no more than about 5% or no more than about 4.5% by weight.

In certain embodiments, after step (f), the resulting dried, granulated particles do not require size reduction (i.e., they are substantially un-agglomerated) and can be filled directly into a single use/unit dose package. The lack of need for size reduction improves the purity of the final product, and avoids degradation of insulin.

In some further embodiments, the method optionally further comprises sieving the dried, granulated particles from step (f) to provide a multiparticulate granulate having particle size ranging from about 125 µm to about 1000 µm, including about 150 µm, about 175 µm, about 200 µm, about 225 µm, about 250 µm, about 275 µm, about 300 µm, about 325 µm, about 350 µm, about 375 µm, about 400 µm, about 425 µm, about 450 µm, about 475 µm, about 500 µm, 525 µm, about 550 µm, about 575 µm, about 600 µm, about 625 µm, about 650 µm, about 675 µm, about 700 µm, about 725 µm, about 750 µm, about 775 µm, about 800 µm, about 825

µm, about 850 µm, about 875 µm, about 900 µm, about 925 µm, about 950 µm, and about 975 µm, including all ranges there between.

Certain embodiments provide a multiparticulate granulate prepared according to the methods described herein.

Pharmaceutical Solutions and Packaging

In one aspect, the present disclosure provides a pharmaceutical solution comprising a multiparticulate granulate of present disclosure that is reconstituted in a pharmaceutically-acceptable aqueous medium, breast milk or infant formula. Pharmaceutically-acceptable aqueous media, breast milks and infant formulas are known to those skilled in the art and any suitable such liquid may be used according to the present disclosure. However, in particular embodiments, the pharmaceutically-acceptable aqueous medium is saline. In other particular embodiments, the breast milk is donor breast milk.

Some embodiments provide multiparticulate granulates, wherein when the granulates are reconstituted the dissolved insulin exhibits substantially no non-specific binding to plastic or glass surfaces. In specific embodiments, the plastic is rubber, polyurethane, polypropylene or silicone.

In some embodiments, no more than about 10% of the insulin in a reconstituted sample of the multiparticulate granulate is lost in a reconstitution nasogastric tube recovery study using a polyurethane or silicone tube (size 4, 5, 6 or 8 Fr).

It has unexpectedly been found that reconstituting the multiparticulate granulate in breast milk, rather than saline, increases the recovery from plastic containers and nasogastric tubes typically used for storage purposes or to administer treatment to infant patients.

In some embodiments, when breast milk is used to prepare the pharmaceutical solution between about 75% to about 99%, including about 80%, about 85%, about 90%, and about 95%, including all ranges and values there between, of the insulin in a reconstituted sample of the multiparticulate granulate is recovered in a reconstitution nasogastric tube recovery study using a polyurethane or silicone tube (size 4, 5, 6 or 8 Fr).

In some embodiments, when breast milk is used to prepare the pharmaceutical solution between about 75% to about 99%, including about 80%, about 85%, about 90%, and about 95%, including all ranges and values there between, of the insulin in a reconstituted sample of the multiparticulate granulate is recovered in a reconstitution syringe recovery study using a polypropylene syringe (size 1 mL or 2.5 mL).

In some embodiments, when breast milk is used to prepare the pharmaceutical solution no more than about 10%, no more than about 9%, no more than about 8%, no more than about 7%, no more than about 6%, no more than about 5%, no more than about 4%, no more than about 3%, or no more than about 2% of the insulin in a reconstituted sample of the multiparticulate granulate is lost in a reconstitution nasogastric tube recovery study using a polyurethane or silicone tube (size 4, 5, 6 or 8 Fr).

In some embodiments, when breast milk is used to prepare the pharmaceutical solution no more than about 10%, no more than about 9%, no more than about 8%, no more than about 7%, no more than about 6%, no more than about 5%, no more than about 4%, no more than about 3%, or no more than about 2% of the insulin in a reconstituted sample of the multiparticulate granulate is lost in a reconstitution syringe recovery study using a polypropylene syringe (size 1 mL or 2.5 mL).

Infant patients with underdeveloped GI tracts are at high risk for intestinal malabsorption. Thus, this patient population is particularly susceptible to possible side effects associated with oral drug administration (such as pharmaceutical solutions containing the presently disclosed multiparticulate granulate). For example, the oral administration of hypertonic solutions may result in severe diarrhea in the treated infants, a potentially life-threatening effect in such a fragile patient population. Without being bound by any theory, it is believed that reconstituted NTRA-2112 solutions having an osmolality value that is similar to breast milk (i.e., about iso-osmolar) should reduce the adverse side effects compared to oral administration of liquids that are hypo-osmolar or hyper-osmolar to breast milk.

In some embodiments, the present disclosure provides a pharmaceutical solution comprising (a) a therapeutically effective amount of the multiparticulate granulate of the present disclosure and (b) a reconstituting liquid selected from a pharmaceutically acceptable aqueous medium, breast milk or infant formula, wherein the pharmaceutical solution is about iso-osmolar to breast milk. In some embodiments, the reconstituting liquid is breast milk.

In some embodiments, the present disclosure provides a pharmaceutical solution comprising (a) a therapeutically effective amount of the multiparticulate granulate of the present disclosure and (b) a reconstituting liquid selected from a pharmaceutically acceptable aqueous medium, breast milk or infant formula, wherein the pharmaceutical solution provides an osmolality between about 250 mOsmol/kg to about 370 mOsmol/kg, including about 250 mOsmol/kg, about 260 mOsmol/kg, about 270 mOsmol/kg, about 280 mOsmol/kg, about 290 mOsmol/kg, about 300 mOsmol/kg, about 310 mOsmol/kg, about 320 mOsmol/kg, about 330 mOsmol/kg, about 340 mOsmol/kg, about 350 mOsmol/kg, about 360 mOsmol/kg, or about 370 mOsmol/kg, including all ranges and values there between.

In some embodiments, the present disclosure provides a pharmaceutical solution comprising (a) a therapeutically effective amount of the multiparticulate granulate of the present disclosure and (b) a reconstituting liquid selected from a pharmaceutically acceptable aqueous medium, breast milk or infant formula, wherein the pharmaceutical solution provides an osmolality of between about 290 mOsmol/kg to about 340 mOsmol/kg, including about 290 mOsmol/kg, about 295 mOsmol/kg, about 300 mOsmol/kg, about 305 mOsmol/kg, about 310 mOsmol/kg, about 315 mOsmol/kg, about 320 mOsmol/kg, about 325 mOsmol/kg, about 330 mOsmol/kg, about 335 mOsmol/kg, about 340 mOsmol/kg, including all ranges and values there between.

In some embodiments, the present disclosure provides a pharmaceutical solution comprising (a) a therapeutically effective amount of the multiparticulate granulate of the present disclosure and (b) a reconstituting liquid selected from a pharmaceutically acceptable aqueous medium, breast milk or infant formula, wherein the pharmaceutical solution provides an osmolality of between 302 mOsmol/kg to about 330 mOsmol/kg, including about 302 mOsmol/kg, about 304 mOsmol/kg, about 306 mOsmol/kg, about 308 mOsmol/kg, about 310 mOsmol/kg, about 312 mOsmol/kg, about 314 mOsmol/kg, about 316 mOsmol/kg, about 318 mOsmol/kg, about 320 mOsmol/kg, about 322 mOsmol/kg, about 324 mOsmol/kg, about 326 mOsmol/kg, about 328 mOsmol/kg, or about 330 mOsmol/kg, including all ranges and values there between.

In some embodiments, the present disclosure provides a pharmaceutical solution comprising (a) a therapeutically effective amount of the multiparticulate granulate of the present disclosure and (b) a reconstituting liquid selected from a pharmaceutically acceptable aqueous medium, breast milk or infant formula, wherein the pharmaceutical solution provides an osmolality selected from about 290 mOsmol/kg, about 295 mOsmol/kg, about 300 mOsmol/kg, about 305 mOsmol/kg, about 310 mOsmol/kg, about 315 mOsmol/kg, about 320 mOsmol/kg, about 325 mOsmol/kg, about 330 mOsmol/kg, about 335 mOsmol/kg, or about 340. In further embodiments, the osmolality of the pharmaceutical solution is about 300 mOsmol/kg. In further embodiments, the osmolality of the pharmaceutical solution is about 305 mOsmol/kg. In further embodiments, the osmolality of the pharmaceutical solution is about 310 mOsmol/kg. In further embodiments, the osmolality of the pharmaceutical solution is about 315 mOsmol/kg. In further embodiments, the osmolality of the pharmaceutical solution is about 320 mOsmol/kg. In further embodiments, the osmolality of the pharmaceutical solution is about 325 mOsmol/kg. In further embodiments, the osmolality of the pharmaceutical solution is about 330 mOsmol/kg.

In one aspect of the present disclosure, a package filled with the multiparticulate granulate of the present disclosure is provided.

In some embodiments, the package is a stick pack. In specific embodiments, the disclosure provides a stick pack filled with a multiparticulate granulate comprising about 0.02 IU (or 20000 µU) insulin per stick pack (e.g., 0.5 g/stick pack, at an insulin concentration of about 0.04 IU/g), about 0.1 IU (or 100000 µU) insulin per stick pack (e.g., 0.5 g/stick pack, at an insulin concentration of about 0.2 IU/g), about 4 IU insulin per stick pack (e.g., 1 g/stick pack, at an insulin concentration of about 4 IU/g) or about 8 IU insulin per stick pack (e.g., 1 g/stick pack, at an insulin concentration of about 8 IU/g). In further specific embodiments, the stick pack is filled with about 500 mg or 1 gram of the multiparticulate granulate.

In some embodiments, the package is a sachet. In specific embodiments, the disclosure provides a sachet filled with a multiparticulate granulate comprising about 0.02 IU (or 20000 µU) insulin per sachet (e.g., 0.5 g/sachet, at an insulin concentration of about 0.04 IU/g), about 0.1 IU (or 100000 µU) insulin per sachet (e.g., 0.5 g/sachet, at an insulin concentration of about 0.2 IU/g), about 4 IU insulin per sachet (e.g., 1 g/sachet, at an insulin concentration of about 4 IU/g) or about 8 IU insulin per sachet (e.g., 1 g/sachet, at an insulin concentration of about 8 IU/g). In further specific embodiments, the sachet is filled with about 500 mg or 1 gram of the multiparticulate granulate.

In some embodiments, the package is a sprinkle capsule. In specific embodiments, the disclosure provides a sprinkle capsule filled with a multiparticulate granulate comprising about 0.02 IU (or 20000 µU) insulin per sprinkle capsule (e.g., 0.5 g/sprinkle capsule, at an insulin concentration of about 0.04 IU/g), about 0.1 IU (or 100000 µU) insulin per sprinkle capsule (e.g., 0.5 g/sprinkle capsule, at an insulin concentration of about 0.2 IU/g), about 4 IU insulin per sprinkle capsule (e.g., 1 g/sprinkle capsule, at an insulin concentration of about 4 IU/g) or about 8 IU insulin per sprinkle capsule (e.g., 1 g/sprinkle capsule, at an insulin concentration of about 8 IU/g). In further specific embodiments, the sprinkle capsule is filled with about 500 mg or 1 gram of the multiparticulate granulate.

In some embodiments, the package comprises a foil laminate. In certain embodiments, the foil laminate comprises polyethylene terephthalate/aluminum/polyethylene or paper/aluminum/polyethylene.

In some embodiments, the package provides a moisture and/or oxygen barrier. In certain embodiments, the package provides a moisture vapor transmission rate (MVTR) of less than about 0.1 g/m$^2$/24 h and an oxygen transmission rate (OTR) of less than about 0.1 cm$^3$/m$^2$/24 h.

When packaged as disclosed herein, the present multiparticulate granulate compositions are highly stable and can be stored for prolonged periods. In some embodiments, the sum of the insulin and A-21 desamido insulin of the packaged multiparticulate granulate decreases by no more than about 10%, no more than about 9%, no more than about 8%, no more than about 7%, no more than about 6%, no more than about 5%, no more than about 4%, no more than about 3%, or no more than about 2% when the packaged granulate is stored at between about 2° C. to about 8° C. for 12 months. In some embodiments, the sum of the insulin and A-21 desamido insulin of the packaged multiparticulate granulate decreases by no more than about 10%, no more than about 9%, no more than about 8%, no more than about 7%, no more than about 6%, no more than about 5%, no more than about 4%, no more than about 3%, or no more than about 2% when the packaged granulate is stored at between about 2° C. to about 8° C. for 24 months. In some embodiments, the sum of the insulin and A-21 desamido insulin of the packaged multiparticulate granulate decreases by no more than about 10%, no more than about 9%, no more than about 8%, no more than about 7%, no more than about 6%, no more than about 5%, no more than about 4%, no more than about 3%, or no more than about 2% when the packaged granulate is stored at about 23° C. for 3 months.

The multiparticulate granulate of the present disclosure comprises maltodextrin, a solid that readily absorbs moisture. If substantial amounts of water are absorbed by the multiparticulate granulate, the flow of the multiparticulate granulate from the packaging may be hindered and microbial growth may occur, thereby contaminating the packaged product. In some embodiments, the water content of the packaged multiparticulate granulate increases by no more than about 3% by weight, no more than about 2% by weight, or no more than about 1% by weight of water when the packaged granulate is stored at between about 2° C. to about 8° C. for 24 months. In some embodiments, the water content of the packaged multiparticulate granulate increases by no more than about 3% by weight, no more than about 2% by weight, or no more than about 1% by weight of water when the packaged granulate is stored at about 23° C. for 3 months.

In some embodiments, the water content of the packaged multiparticulate granulate is not more than about 4.5% by weight, not more than about 5.0% by weight, not more than about 5.5% by weight, not more than about 6.0% by weight, not more than about 6.5% by weight, or not more than about 7.0% by weight when the packaged granulate is stored at between about 2° C. to about 8° C. for 24 months. In certain embodiments, the water content of the packaged multiparticulate granulate is not more than about 6.5% by weight when the packaged granulate is stored at between about 2° C. to about 8° C. for 24 months.

In some embodiments, the water content of the packaged multiparticulate granulate is not more than about 4.5% by weight, not more than about 5.0% by weight, not more than about 5.5% by weight, not more than about 6.0% by weight, not more than about 6.5% by weight, or not more than about 7.0% by weight when the packaged granulate is stored at about 23° C. for 3 months. In certain embodiments, the water content of the packaged multiparticulate granulate is not more than about 6.5% by weight when the packaged granulate is stored at about 23° C. for 3 months.

Methods of Treatment

The disclosure provides methods for treating diseases or disorders that effect infant patients by dissolving the multiparticulate granulate of the present disclosure into a pharmaceutically acceptable aqueous medium, breast milk or infant formula to provide an insulin-containing solution and administering (e.g., orally) a therapeutically-effective amount of the solution to an infant in need thereof.

In some embodiments, the concentration of insulin administered to the infant is from about 200 µU/mL of pharmaceutically acceptable aqueous medium, breast milk or infant formula to about 4,000 µU/mL of pharmaceutically acceptable aqueous medium, breast milk or infant formula. In further embodiments, the concentration of insulin administered to the infant is from about 300 µU/mL of pharmaceutically acceptable aqueous medium, breast milk or infant formula to about 3,000 µU/mL of pharmaceutically acceptable aqueous medium, breast milk or infant formula. In further embodiments, the concentration of insulin is from about 400 µU/mL of pharmaceutically acceptable aqueous medium, breast milk or infant formula to about 2,000 µU/mL of pharmaceutically acceptable aqueous medium, breast milk or infant formula. In some embodiments, the concentration of insulin is about 200 µU/mL, about 300 µU/mL, 400 µU/mL, about 500 µU/mL, about 600 µU/mL, about 700 µU/mL, about 800 µU/mL, about 900 µU/mL, about 1,000 µU/mL, about 1,100 µU/mL, about 1,200 µU/mL, about 1,300 µU/mL, about 1,400 µU/mL, about 1,500 µU/mL, about 1,600 µU/mL, about 1,700 µU/mL, about 1,800 µU/mL, about 1,900 µU/mL, about 2,000 µU/mL, about 2,100 µU/mL, about 2,200 µU/mL, about 2,300 µU/mL, about 2,400 µU/mL, about 2,500 µU/mL, about 2,600 µU/mL, about 2,700 µU/mL, about 2,800 µU/mL, about 2,900 µU/mL, about 3,000 µU/mL, about 3,100 µU/mL, 3,200 µU/mL, about 3,300 µU/mL, about 3,400 µU/mL, about 3,500 µU/mL, about 3,600 µU/mL, about 3,700 µU/mL, about 3,800 µU/mL, about 3,900 µU/mL, or about 4,000 µU/mL of pharmaceutically acceptable aqueous medium, breast milk or infant formula. In some embodiments, the insulin is administered in a composition comprising the recited insulin concentration (e.g., a composition comprising insulin at a concentration of about 200 µU/mL to about 4,000 µU/mL in the composition, or a concentration of about 400 µU/mL or about 2,000 µU/mL in the composition). In other embodiments, the insulin is administered in a total dose of about 200 µU/mL of pharmaceutically acceptable aqueous medium, breast milk or infant formula to about 4,000 µU/mL of pharmaceutically acceptable aqueous medium, breast milk or infant formula, wherein the insulin concentration is based on the amount of insulin administered to the infant in the infant's total pharmaceutically acceptable aqueous medium, breast milk or infant formula in a dosing session, including pharmaceutically acceptable aqueous medium, breast milk or infant formula administered prior to, during, and/or subsequent to the administration of a composition comprising insulin.

In some embodiments, the disease or disorder is enteropathy or intestinal malabsorption in premature infants. In certain embodiments, a method of treating enteropathy or intestinal malabsorption in premature infants by dissolving a multiparticulate granulate of the present disclosure into a pharmaceutically acceptable aqueous medium, breast milk or infant formula to provide a dose of at least about 400 µU of insulin/mL and administering the dissolved insulin to the premature infant is provided. In particular embodiments, the dose is about 400 µU of insulin/mL or 2000 µU of insulin/mL.

In other embodiments, the disease or disorder is neonatal short bowel syndrome. In certain embodiments, a method of treating neonatal short bowel syndrome in infants by dissolving a multiparticulate granulate of the present disclosure into a pharmaceutically acceptable aqueous medium, breast milk or infant formula to provide a dose of at least about 4 U of insulin/mL and administering the dissolved insulin to the infant is provided. In particular embodiments, the dose is about 4 U of insulin/mL or 8 U of insulin/mL.

In some embodiments, the pharmaceutically-acceptable aqueous medium is saline or half-saline. In other particular embodiments, the breast milk is donor breast milk.

In some embodiments, the multiparticulate granulate is provided in the stick packs described herein.

In some embodiments, the dose is administered by nasogastric administration. In other embodiments, the dose is administered by oral administration.

Co-Therapy

While the insulin compositions of the present disclosure can be administered as the sole active pharmaceutical ingredient in the methods described herein, in other embodiments they can be used in combination with one or more ingredients or active agents that are known to be used in the treatment of premature infants. For example, such additional ingredients or active agents can include probiotics such as are known in the art, prebiotics such as oligosaccharides, and proton pump inhibitors (such as omeprazole, lansoprazole, dexlansoprazole, esomeprazole, pantoprazole, rabeprazole, and ilaprazole) known in the art.

For example, in some embodiments, the present methods can employ the composition in conjunction with one or more probiotics or prebiotics. In some embodiments, additional active agents combined with the insulin, include proton pump inhibitors as described herein.

EXAMPLES

Example 1: Preparation of Multiparticulate Granulate

Optimization studies were undertaken to establish a method for making the multiparticulate granulate (NTRA-2112) of the present disclosure. In particular, processes that used different granulation and drying sequences were evaluated to improve overall process efficiency (by, for example, reducing the process cycle time) while providing a multiparticulate granulate that meets clinical quality standards (by, for example, minimizing product degradation caused by exposure of insulin to high temperatures). Set forth below is a comparison of three process variants as well as data obtained from samples of the multiparticulate granulate produced by each process. All process variants used a bottom spray coater (Wurster coater) for the granulation steps.

Process 1:

Process 1 utilized two separate granulation steps (Steps 2 and 3, below) and two drying steps (Steps 2 and 3). The process was conducted using a 10 h cycle time.

Step 1: Preparation of insulin granulating liquid: Insulin is dissolved in aqueous hydrochloric acid (0.1 N) to provide an acidic insulin solution (100 IU insulin/g solution). The pH of the acidic insulin solution is adjusted to about 8.25 using aqueous sodium hydroxide (0.5 N). The insulin granulating liquid is prepared by adding the pH adjusted solution to a solution of sodium chloride then maltodextrin is added to the solution, which provides a solution that is suitable as a granulating liquid.

Step 2: Granulation with insulin granulating liquid: Maltodextrin particles are passed through a sieve to provide particles having particle size range from about 125 μm to about 500 μm. The sieved maltodextrin particles are then granulated with the granulating liquid provided by Step 1 and the resulting granulate is dried.

Step 3: Granulation with maltodextrin granulating liquid: The dried granulate of Step 2 is granulated with a granulating liquid comprising water, maltodextrin, and sodium chloride and the resulting multiparticulate granulate is dried to provide a moisture content of no more than 6.5% by weight.

Step 4: Sieving and packaging: The dried multiparticulate granulate of Step 3 is passed through a sieve to provide particles having particle size range from about 125 μm to about 850 μm. One or 0.5 gram of the sieved multiparticulate granulate is filled to a stick pack and the pack is sealed using standard methods. Typically, higher insulin strengths such as 4 and 8 IU/g are packaged in 1 gram stick packs, while lower insulin strengths such as 0.04 and 0.2 IU/g are packaged in 0.5 g stick packs.

The temperature throughout the process is maintained at no more than 37° C.

Figure 2:
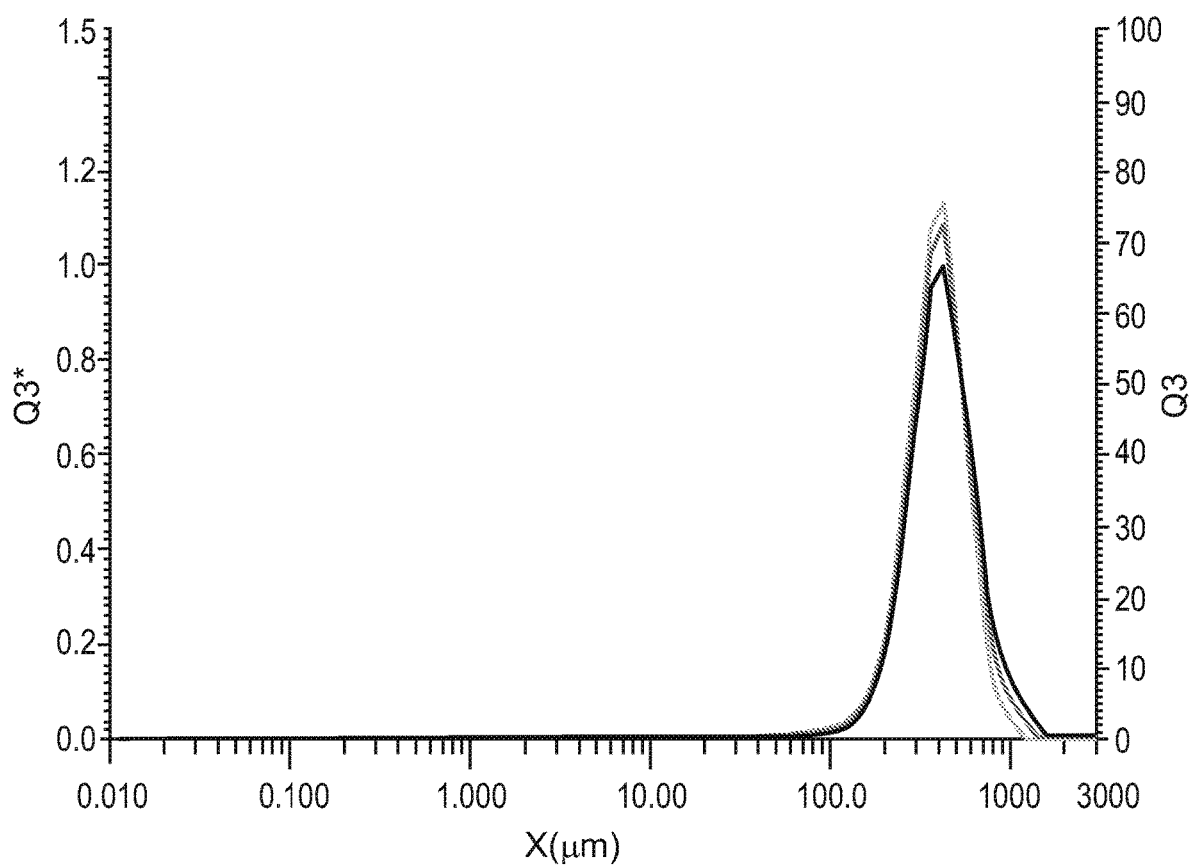
FIG. 2 shows the monomodal particle size distribution of three samples of the multiparticulate cogranulate of the present disclosure.
Figure 3:
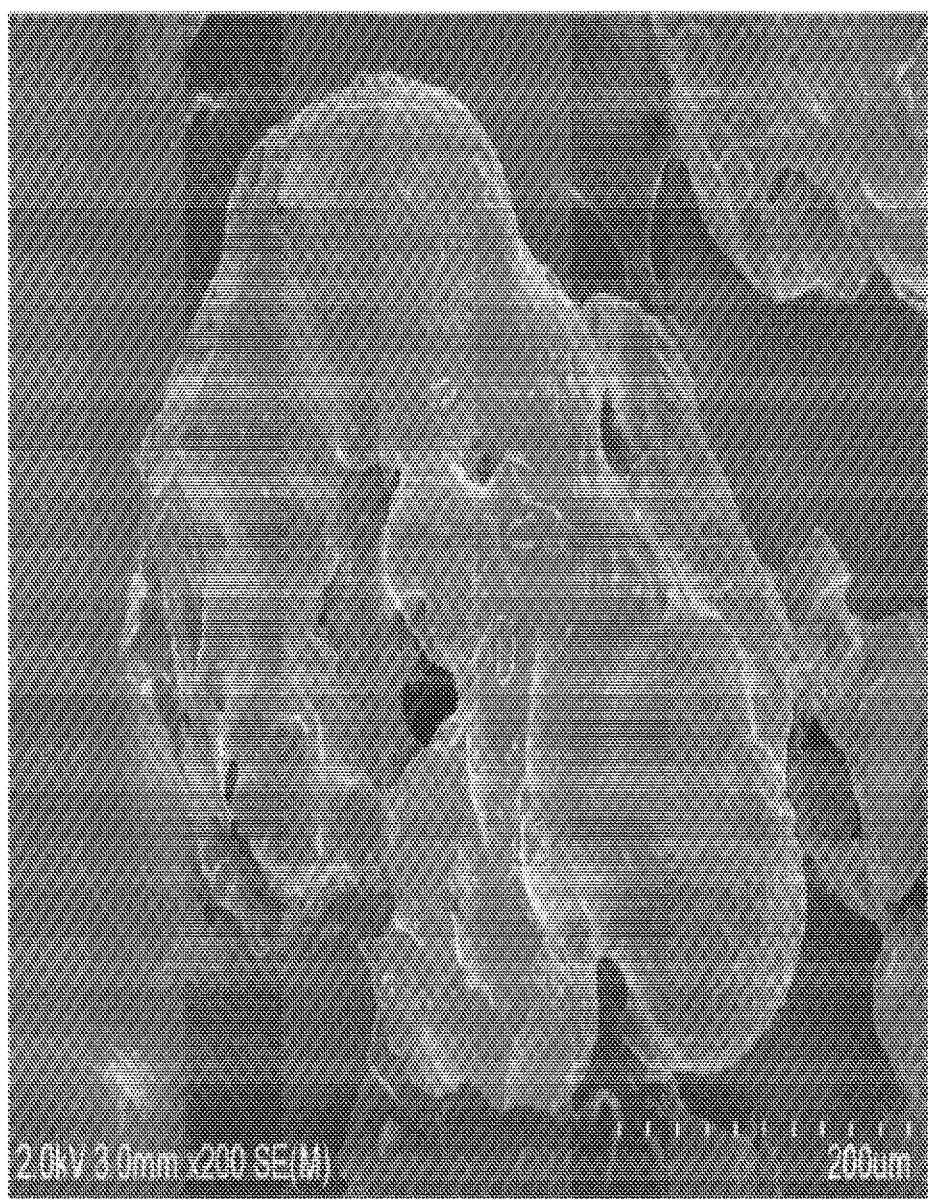
FIG. 3 shows a scanning electron microscope image of the exterior of a multiparticulate cogranulate of the present disclosure.
Figure 4:
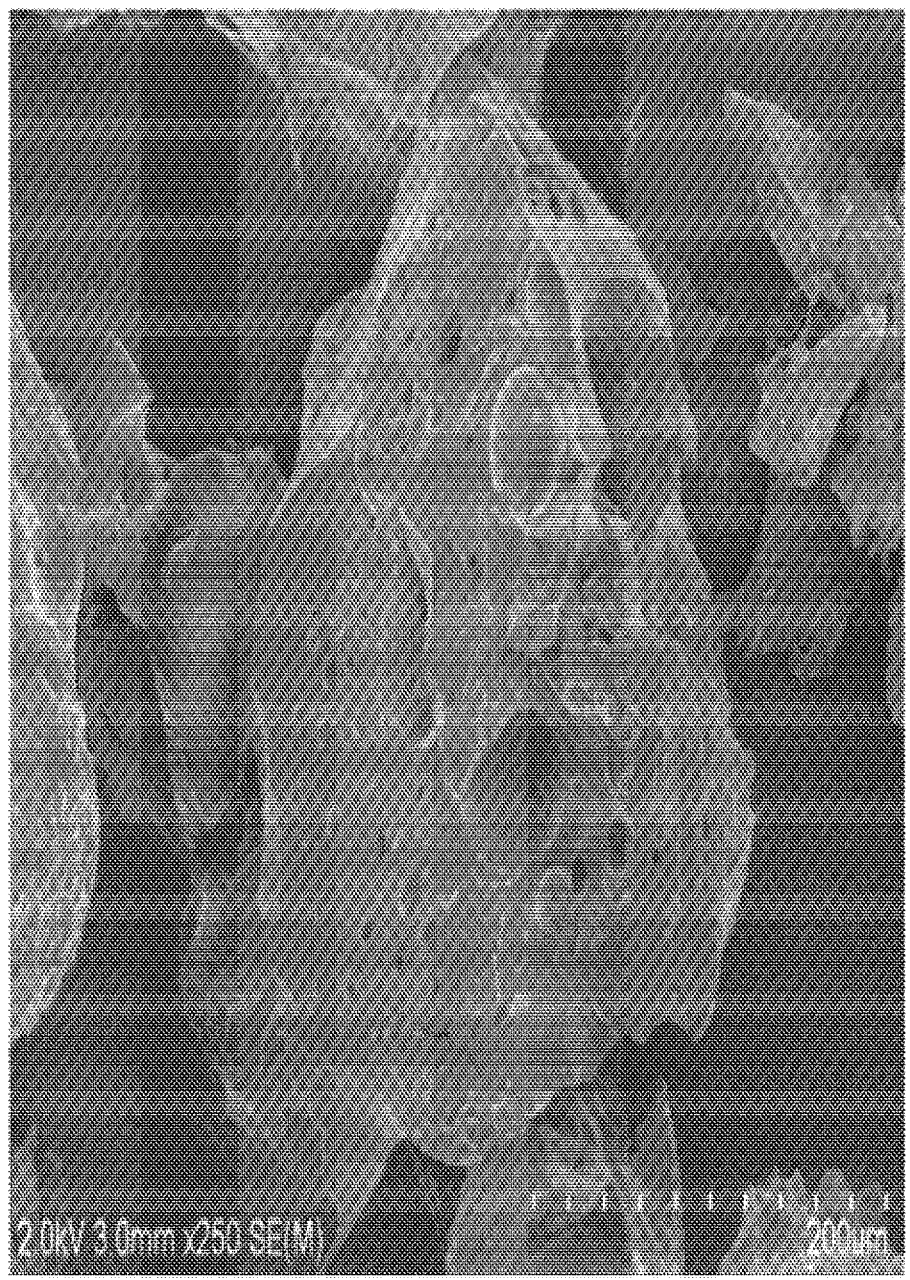
FIG. 4 shows a scanning electron microscope image of the interior of a multiparticulate cogranulate of the present disclosure.

A microscopy image of a multiparticulate granulate prepared according to this method is shown in FIG. 1. The particle size distribution of a multiparticulate granulate prepared according to this method is shown in FIG. 2. The scanning electron microscope image of the exterior and interior of the multiparticulate granulate prepared according to this method are shown in FIGS. 3 and 4, respectively. The images show that the product is multiparticulate granulate and not a layered formulation.

Process 2:

Process 2 utilized two separate granulation steps (Steps 2 and 3, below) and one drying step (Step 3). The process was conducted using a 2.5 h cycle time (Short Process 2), and a 3.5 h cycle time (Long Process 2).

Step 1: Preparation of insulin granulating liquid: Insulin is dissolved in aqueous hydrochloric acid (0.1 N) to provide an acidic insulin solution (100 IU insulin/g solution). The pH of the acidic insulin solution is adjusted to about 8.25 using aqueous sodium hydroxide (0.5 N). The insulin granulating liquid is prepared by adding the pH adjusted solution to a solution of sodium chloride then maltodextrin is added to the solution, which provides a solution that is suitable as a granulating liquid.

Step 2: Granulation with insulin granulating liquid: Maltodextrin particles are passed through a sieve to provide particles having particle size range from about 125 μm to about 500 μm. The sieved maltodextrin particles are then granulated with the granulating liquid provided by Step 1, and used directly in the next step without drying.

Step 3: Granulation with maltodextrin granulating liquid: The undried granulate of Step 2 is granulated with a granulating liquid comprising water, maltodextrin, and sodium chloride and the resulting multiparticulate granulate is dried to provide a moisture content of no more than 6.5% by weight.

Step 4: Sieving and packaging: The dried multiparticulate granulate of Step 3 is passed through a sieve to provide particles having particle size range from about 125 μm to about 850 μm. One or 0.5 gram of the sieved multiparticulate granulate is filled to a stick pack and the pack is sealed using standard methods. Typically, higher insulin strengths such as 4 and 8 IU/g are packaged in 1 gram stick packs, while lower insulin strengths such as 0.04 and 0.2 IU/g are packaged in 0.5 g stick packs.

Process 3:

Process 3 utilized one granulation step (Step 2, below) and one drying step (Step 2). The process was conducted using a 1.5 h cycle time (Process 3, Short), 2 h cycle time (Process 3, Medium) and a 3.5 h cycle time (Process 3, Long).

Step 1: Preparation of insulin granulating liquid: Insulin is dissolved in aqueous hydrochloric acid (0.1 N) to provide an acidic insulin solution (100 IU insulin/g solution). The pH of the acidic insulin solution is adjusted to about 8.25 using aqueous sodium hydroxide (0.5 N). The insulin granulating liquid is prepared by adding the pH adjusted solution to a solution of sodium chloride then maltodextrin is added to the solution, which provides a solution that is suitable as a granulating liquid. The total amount of maltodextrin and sodium chloride used in Step 1 is equivalent to the total combined amounts used in Steps 1 and 3 of Processes 1 and 2.

Step 2: Granulation with insulin granulating liquid: Maltodextrin particles are passed through a sieve to provide particles having particle size range from about 125 μm to about 500 μm. The sieved maltodextrin particles are then granulated with the granulating liquid provided by Step 1, and the resulting multiparticulate granulate is dried to provide a moisture content of no more than 6.5% by weight.

Step 3: Sieving and packaging: The dried multiparticulate granulate of Step 2 is passed through a sieve to provide particles having particle size range from about 125 μm to about 850 μm. One or 0.5 gram of the sieved multiparticulate granulate is filled to a stick pack and the pack is sealed using standard methods. Typically, higher insulin strengths such as 4 and 8 IU/g are packaged in 1 gram stick packs, while lower insulin strengths such as 0.04 and 0.2 IU/g are packaged in 0.5 g stick packs.

The multiparticulate granulate prepared according the Processes 1 2, and 3 were tested for insulin assay, A21-desamido content, related substance degradants, water content, content uniformity and stability (as determined by ICH stability studies) that meet clinical product quality standards. The data are shown in Table 1, below.

Analysis: Water content was measured using a Glatt PV 1553 or Analyst (SOP 09.570). All other assays were carried out on a Heppeler HPLC DAD/FLD (SOP 0772) or Analyst (SOP 09.654).

Comparison of Process Specifications

TABLE 1

Testing results for Processes 1-3

| Process | Duration (~h) | Content Uniformity (%) - Mean (RSD) | Assay (insulin + A21 desamido) 90%-120% | A21-desamido (NMT 5%) | Total degradation Products (NMT 15%) | Water content (NMT 6.5%) |
|---|---|---|---|---|---|---|
| Process 1 | 10 | 113.75 (0.5) | 112.0 | 1.1 | 0.9 | 5.4 |
| Process 2, Long | 3.5 | — | 110.4 | 1.0 | 0.8 | 5.8 |
| Process 3, Long | 3.5 | — | 108.6 | 1.1 | 1.7 | 5.3 |
| Process 3, Medium | 2 | — | 109.6 | 1.1 | 1.2 | 5.1 |
| Process 3, Short | 1.5 | 111.41 (0.7) | 111.8 | 1.1 | 1.0 | 4.5 |

Results: The multiparticulate granulate prepared according the Processes 1 2, and 3 exhibited insulin assay, A21-desamido content, related substance degradants, water content, content uniformity and stability (as determined by ICH stability studies) that meet clinical product quality standards. Thus, Processes 2 and 3 reduce processing time without a deleterious effect in the product quality parameters described in Table 1.

Example 2: Recovery Studies

Studies were undertaken to determine the stability of pharmaceutical solutions containing the multiparticulate granulates of the present disclosure using saline and breast milk as the reconstituting liquid. The studies assessed the percent recovery of insulin from reconstituted samples stored in containers that are clinically relevant to use of the compositions of the present disclosure. In particular, the tested containers includes polypropylene tubes, syringes and nasogastric feeding tubes.

Example 2a—Recovery studies from saline solution: In-use recovery of human insulin in NTRA-2112 reconstituted in saline solutions having a concentration of 0.01 IU/mL and 0.05 IU/mL was studied. The purpose was to determine the amount of human insulin recovered at various time points during storage in plastic syringes (Vygon nutrisafe2 syringes—cat. no. 1015.012). These syringes may be used to administer reconstituted NTRA-2112 through a nasogastric tube according to the treatment methods described herein. Thus, to provide accurate dosing, it is important to ascertain how much insulin, if any, is lost to non-specific binding (e.g., surface adsorption) and/or degradation in plastic containers typically used for storage. The following studies compare the storage stability of multiparticulate granulate compositions reconstituted in saline.

Sample Preparation 1. 0.01 IU/mL solution: NTRA-2112 was reconstituted in polypropylene test tubes using saline solution at a concentration of 0.01 IU/mL by diluting 3 stick-packs (0.02 IU/STP) in 4.5 mL saline.
2. 0.05 IU/mL solution: NTRA-2112 was reconstituted in polypropylene test tubes using saline solution at a concentration of 0.05 IU/mL by diluting 3 stick-packs (0.1 IU/STP) in 4.5 mL saline.

Sample Analysis:

1. Three solutions from each concentration were prepared, restored and assayed directly in a 50 mL polypropylene test tubes (Table 2).
2. For time zero, three 1 mL syringes were filled with 1 mL from each concentration and subsequently the entire content was decanted and restored in 50 mL polypropylene test tube.
3. For the 4-hour stability test, three 1 mL syringes were filled with 1 mL from each concentration and placed at 5° C. After ~4 hours, the entire content was decanted and restored in a 50 mL polypropylene test tube.
4. For the 16-hour stability test, three 1 mL syringes were filled with 1 mL from each concentration and placed at 5° C. After ~16 hours, the entire content was decanted and restored in a 50 mL polypropylene test tube.
5. For the 24-hour stability test, three 1 mL syringes were filled with 1 mL from each concentration and placed at 5° C. After ~24 hours, the entire content was decanted and restored in a 50 mL polypropylene test tube.

Quantitative method: Recovery of human insulin from saline solutions stored in 1-mL syringes (after decantation and restoration in 50 mL polypropylene test tubes) is calculated against directly restored solution. The presented in Table 3 is the mean value of recovered human insulin from experiments performed from three experiments. The calculated percent recovery of human insulin summarized in Table 3 is calculated from the ratio of the mean value recovered from 1-mL syringes to the baseline mean recovery value provided in Table 2 for saline solutions of human insulin stored in polypropylene tubes.

TABLE 2

Amount of human insulin recovered for 0.01 IU/mL and 0.05 IU/mL of NTRA-2112 reconstituted in saline solution and restored directly in polypropylene test tubes (control).

| NTRA-2112 (g) | Sample volume (mL) | Recovered human insulin-IU/mL |
|---|---|---|
| 1722 | 5.616 | 0.012 |
| 1632 | 5.534 | 0.062 |

TABLE 3

Amount and Percent recovery of human insulin for 0.01 IU/mL and 0.05 IU/mL of NTRA-2112 reconstituted in saline solution and stored in 1-mL syringes.

| Sample | Recovered human insulin-IU/mL (% Recovery) | | | |
|---|---|---|---|---|
| | t = 0 h | t = 4.5 h | t = 16 h | t = 24 h |
| 0.01 IU/mL NTRA-2112 | 0.010 (81.2) | 0.008 (66.7) | 0.007 (55.6) | 0.005 (39.4) |
| 0.05 IU/mL NTRA-2112 | 0.036 (58.1) | 0.018 (28.4) | 0.011 (18.0) | 0.0108 (17.4) |

Results: The recovery results for the 0.01 IU/mL saline solutions indicate that rapid adsorption occurs for human insulin, such that after 4.5 h only 67% of human insulin is recovered. The recovery further decreased for each subsequent time period, with a low of 39% obtained after 24 h (Table 3).

The recovery results for the 0.05 IU/mL saline solutions are lower than the 0.01 IU/mL saline solutions. At this concentration, after 4.5 h the mean recovery was 28%. After 24 h, the mean recovery was 17% (Table 3).

Example 2b—Recovery Studies Using Breast Milk

In-use recovery of human insulin in NTRA-2112 reconstituted in breast milk having a concentration of 0.0094 IU/mL and 0.047 IU/mL was studied and compared to the results achieved using saline solutions. Recovery was recorded at 0 h, 24 h, 48 h, and 72 h from solutions stored in 50 mL polypropylene test tubes, as well as in 1 mL and 2.5 mL syringes cooled to 5° C.

The purpose of the study was to determine the amount of human insulin recovered at various time points during storage in plastic syringes (Vygon nutrisafe2 syringes—cat. no. 1015.012) and/or passage through nasogastric feeding tubes, both of which can be used to administer solutions of the multiparticulate granulates described herein to infant patients. However, providing an accurate dose of insulin through nasogastric tubes is challenging because, as described above, insulin non-specifically binds to the surface of such plastic materials. Thus, a pharmaceutical solution that provides high levels of insulin recovery after storage in and/or contact with plastic containers would be highly advantageous. The following recovery studies show that pharmaceutical solutions using breast milk as the reconstituting liquid show significantly higher insulin recovery compared pharmaceutical solutions using saline as the reconstituting liquid.

Sample preparation: Preparation of low volume (lv) and high volume (hv) stock solutions in 50 mL polypropylene test tubes according to the following for in-use testing (Tables 4 and 5): Each solution above was prepared by adding the specified amount of breast milk and subsequently the specified number of stick-packs. Samples were mixed by rotator shaker and vortex until fully dissolved. The total sample volume in the table above is based on the average fill weight of the drug product used taking into account the densities of the breast milk (1.025 g/mL) and the overall sample density (1.106 g/mL). Densities were measured using a pycnometer; weight variations relative to nominal 0.5 g drug product are assumed not to have any significant effect on the density and were neglected.

TABLE 4

Preparation of solutions in polypropylene test tubes from NTRA-2112 (0.02 IU/STP)

| | 50 mL PP test tubes (LV) | 50 mL PP test tubes (HV) |
|---|---|---|
| No. of replicates: | 12 | 12 |
| Drug product: | 0.02 IU/stp | 0.02 IU/stp |
| No. of stick-packs: | 4 | 7 |
| Human breast milk (mL): | 7.2 | 12.6 |
| Total volume (mL): | 8.5 | 14.8 |

LV-Low volume; HV-high volume

TABLE 5

Preparation of solutions in polypropylene test tubes from NTRA-2112 (0.01 IU/STP)

| | 50 mL PP test tubes (LV) | 50 mL PP test tubes (HV) |
|---|---|---|
| No. of replicates: | 12 | 12 |
| Drug product: | 0.1 IU/stp | 0.1 IU/stp |
| No. of stick-packs: | 4 | 7 |
| Human breast milk (mL): | 7.2 | 12.6 |
| Total volume (mL): | 8.4 | 14.8 |

LV-Low volume; HV-high volume

Sample Preparation for Use in 1 and 2.5 mL Syringes:

Single stock solutions containing 25 stick packs of NTRA-2112 0.1 IU/STP and NTRA-2112 0.02 IU/STP were each prepared in 45 mL breast milk. The solutions were mixed by rotator shaker and vortex until dissolved. Subsequently, twelve 1 mL syringes and twelve 2.5 mL syringes were filled with 1 mL and 2.5 mL solution, respectively from each concentration. At each test interval, the syringes were emptied into 50 mL polypropylene test tubes, and the contents were weighed in order to record the exact amount delivered. Note: syringes were not primed prior to use.

TABLE 6

Amount and percent recovery of human insulin for 0.0094 IU/mL and 0.047 IU/mL NTRA-2112 reconstituted in breast milk and stored in 50 mL polypropylene test tubes (low vs. high volume) or 1-mL and 2.5 mL plastic syringes.

| Entry | Sample | Storage Container | Recovered human insulin - IU/mL (% Recovery) | | | |
|---|---|---|---|---|---|---|
| | | | t = 0 h | t = 24 h | t = 48 h | t = 72 h |
| 1 | 0.0094 IU/mL NTRA-2112 | PP test tube (low volume[a]) | 0.0092 | 0.008 (100) | 0.0078 (84[b]) | 0.0086 (93) |
| 2 | 0.0094 IU/mL NTRA-2112 | PP test tube (high volume[a]) | 0.0093 | 0.0094 (100) | 0.079 (84[b]) | 0.0081 (87) |

TABLE 6-continued

Amount and percent recovery of human insulin for 0.0094 IU/mL and 0.047 IU/mL
NTRA-2112 reconstituted in breast milk and stored in 50 mL polypropylene
test tubes (low vs. high volume) or 1-mL and 2.5 mL plastic syringes.

| | | Storage | Recovered human insulin - IU/mL (% Recovery) | | | |
|---|---|---|---|---|---|---|
| Entry | Sample | Container | t = 0 h | t = 24 h | t = 48 h | t = 72 h |
| 3 | 0.047 IU/mL NTRA-2112 | PP test tube (low volume[a]) | 0.048 | 0.049 (102) | 0.041 (85[b]) | 0.045 (93) |
| 4 | 0.047 IU/mL NTRA-2112 | PP test tube (high volume[a]) | 0.049 | 0.049 (100) | 0.042 (85[b]) | 0.047 (95) |
| 5 | 0.0094 IU/mL NTRA-2112 | 1-mL syringe | 0.0092 | 0.0092 (99) | 0.0079 (85[b]) | 0.0087 (94) |
| 6 | 0.0094 IU/mL NTRA-2112 | 2.5-mL syringe | 0.0088 | 0.0085 (96) | 0.076 (86[b]) | 0.0086 (98) |
| 7 | 0.047 IU/mL NTRA-2112 | 1-mL syringe | 0.049 | 0.047 (96) | 0.044 (90[b]) | 0.046 (94) |
| 8 | 0.047 IU/mL NTRA-2112 | 2.5-mL syringe | 0.048 | 0.0046 (96) | 0.042 (88[b]) | 0.046 (95) |

[a]See Tables 4 and 5 for definition of low (lv) and high (hv) volume formulations.
[b]See discussion below for explanation of results at the 48 h time point.

Results: The recoveries resulting from 0.0094 and 0.047 IU/mL solutions indicate that the formulation in breast milk is stable over 72 h at 5° C. (nominal) in 50 mL polypropylene test tube with recoveries ≥87% (Table 6, entries 1-4).

The 0.0094 and 0.047 IU/mL formulations were also found to be stable when stored for 72 h at 5° C. in 1-mL and 2.5-mL syringes with recoveries ≥94% (Tables 6, entries 5-8). The results at the 48-hour test interval are estimated values, which are ~5% lower than expected based on the data at the other time points. This was due to an aberration in the standard calibration curve preparation. Nonetheless, the data clearly shows that there was no loss in recovery from 0-24 h, from 24-48 h, and from 48-72 h.

According to the data in Table 6, reconstituting NTRA-2112 in breast milk unexpectedly showed significant improvement in insulin recovery compared to the same in saline. Without being bound by any particular theory, the use of breast milk appears to substantially reduce the amount of insulin lost to adsorption onto the plastic surface of both the syringe and nasogastric feeding tube used to administer treatment. The compositions are also found to be stable over the entire duration of the assay.

Sample preparation for use in nasogastric feeding tubes: A single stock solution containing 10 stick-packs of NTRA-2112 0.1 IU/STP and NTRA-2112 0.02 IU/STP into 18 mL breast milk. The solutions were mixed by rotator shaker and vortex until dissolved. Subsequently, three 5 mL syringes are filled with ~5 mL from each concentration and mounted to a nasogastric feeding tube and the solution was gently pushed out to a pre-weighed polypropylene test tube. The test tube was re-weighted in order to record the exact amount of formula delivered. Syringes and nasogastric tubes were not primed prior to use. All samples were processed at each test interval by diluting NTRA-2112 0.02 IU/stp solutions 20-fold in diluent prior to injection and diluting every solution prepared in NTRA-2112 0.1 IU/stp by 100-fold prior to injection. The nominal injection concentration was then 0.0005 IU/mL human insulin.

TABLE 7

Amount and percent recovery of human insulin for 0.0094 IU/mL
and 0.047 IU/mL NTRA-2112 reconstituted in breast milk and
injected from 5 mL syringes through nasogastric feeding tubes.

| Sample | Assay | Recovered human insulin-IU/mL | % Recovery of human insulin-IU/mL |
|---|---|---|---|
| 0.0094 IU/mL NTRA-2112 | Direct Assay- in PP[a] test tube | 0.0092 | — |
| 0.0094 IU/mL NTRA-2112 | Assay after ng[b] tube using 5-mL syringe | 0.091 | 98 |
| 0.047 IU/mL NTRA-2112 | Direct Assay-in PP[a] test tube | 0.0485 | — |
| 0.047 IU/mL NTRA-2112 | Assay after ng[b] tube using 5-mL syringe | 0.0476 | 98 |

[a]PP = polypropylene
[b]ng = nasogastric

Results: The recoveries of 0.0094 and 0.047 IU/mL formulations decanted (5 mL aliquots) through feeding tubes were found to be 98%, suggesting no significant human insulin losses due to adsorption onto the tube surface (Table 7). This surprising discovery should provide more accurate and consistent administered doses when NTRA-2112 is reconstituted in breast milk.

Example 3: Osmolality Studies

Without being bound by any theory, it is believed that pharmaceutical solutions that are about iso-osmolar to breast milk will minimize potential gastrointestinal side effects in infant patients that are orally administered these iso-osmolar liquids compared to patients administered hypo- or hyper-osmolar liquids. Studies were untaken to determine the osmolality of pharmaceutical solutions that contain the multiparticulate granulates of the present disclosure. The following studies demonstrate that reconstituting NTRA-2112 in breast milk provides osmolality values that are substantially similar (i.e., about iso-osmolar) to a breast milk stock solution.

General procedure: One stickpack (0.02 IU/STP or 0.1 IU/STP) was reconstituted in 1.8 mL of saline. Osmolality was measured at time=0 and after 24 h and compared with a 0.9% w/v saline control solution using the method described in Ph. Eur. 9.2 (01/2012:20235).

TABLE 8

Osmolality of insulin reconstituted in saline

| NTRA-2112 Stickpack (stp) conc. IU/stp | Test Solution | T (h) | Osmolality (mOsmol/kg) |
|---|---|---|---|
| — | 0.9 % (w/v) saline | 0 | 284 |
| — | 0.9 % (w/v) saline | 24 | 284 |
| 0.1 | 1 stickpack in 1.8 mL saline (0.9% w/v) | 0 | 559 |
| 0.1 | 1 stickpack in 1.8 mL saline (0.9% w/v) | 24 | 564 |
| 0.02 | 1 stickpack in 1.8 mL saline (0.9% w/v) | 0 | 552 |
| 0.02 | 1 stickpack in 1.8 mL saline (0.9% w/v) | 24 | 550 |

Results: The data in Table 8 show that NTRA-2112 reconstituted in saline exhibits a substantial increase in osmolality compared to 0.9% w/v saline reference solution. The osmolality was independent of insulin concentration, as similar results were for both 0.02 IU/STP and 0.1 IU/STP.

General procedure: One stickpack (0.02 IU/STP or 0.1 IU/STP) was reconstituted in 1.8 mL of saline or breast milk, respectively. 200 µL of reconstituted solution was diluted to 5.0 mL with breast milk, and osmolality was measured using the method described in Ph. Eur. 9.4, (01/2012:20235).

TABLE 9

Osmolality of insulin reconstituted in breast milk (or saline) and diluted with breast milk.

| NTRA-2112 Stickpack (stp) (IU/stp) | Reconstitution Solvent | Osmolality (mOsmol/kg) |
|---|---|---|
| 0.02 | saline | 322 |
| 0.02 | saline | 323 |
| 0.1 | saline | 323 |
| 0.1 | saline | 329 |
| Reference-saline (0.9% NaCl) | | 284 |
| 0.02 | human milk | 323 |
| 0.02 | human milk | 321 |
| 0.1 | human milk | 326 |
| 0.1 | human milk | 329 |
| Reference-human milk | | 306-308 |
| Ref.-0.4 mL saline up to 10 mL human breast milk | | 303-305 |

Results: NTRA-2112 drug product was reconstituted in either saline or breast milk and diluted according to the pharmacy manual (1:25) to mimic the real-life treatment scenario. For comparison, two control solutions were also prepared—human milk, as well as a saline/human milk. Independent of the reconstitution solvent and stickpack used, the measured osmolality was maintained in a narrow range from 321-329 mOsmol/kg (Table 9). Furthermore, the controls were found to have similar osmolality in the range of 303-308. This shows that the product after reconstitution does not have significantly higher or different osmolality compared to human breast milk.

While the described invention has been described with reference to the specific embodiments thereof it should be understood by those skilled in the art that various changes may be made and equivalents may be substituted without departing from the true spirit and scope of the invention. In addition, many modifications may be made to adopt a particular situation, material, composition of matter, process, process step or steps, to the objective spirit and scope of the described invention. All such modifications are intended to be within the scope of the claims appended hereto.

Patents, patent applications, patent application publications, journal articles and protocols referenced herein are incorporated by reference in their entireties, for all purposes.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A multiparticulate granulate composition comprising granules each including particles of insulin dispersed on particles of a maltodextrin at a ratio of about 140,000:1 to about 750,000:1 (w/w), wherein the multiparticulate granulate is substantially free of layers of insulin and dextrin and further wherein the multiparticulate granulate has a content uniformity of about 90-120% with a relative standard deviation (RSD) of no more than about 5%.

2. The composition of claim 1, wherein a particle size of said granules ranges from about 125 µm to about 1000 µm and an average granule particle size ranging from about 200 µm to about 600 µm, monomodal distribution.

3. The composition of claim 1, having a moisture content of no more than about 6.5 wt. %.

4. The composition of claim 1, wherein the particles of insulin include no more than about 5 wt. % A-21 desamido human insulin.

5. The composition of claim 1, wherein the particles of insulin include no more than about 15 wt. % of degradation products of said insulin.

6. The composition of claim 1, wherein at least 80% of the composition-of-matter dissolves within 5 minutes when dispersed in 2/3 by wt. 0.9% saline at 25° C. with vortex mixing at 600 rpm.

7. The composition of claim 1, wherein the insulin concentration is 0.04-8 IU/g.

8. The composition of claim 1, having a flow index of 10-30 seconds per 100 g when passed through a 10 mm orifice.

* * * * *